July 8, 1952

A. A. KNIFF 2,602,477

MACHINE FOR CUTTING TRANSVERSE SLOTS ACROSS STRIPS OF MATERIAL

Filed Aug. 1, 1949

INVENTOR.
AUGUST A. KNIFF
BY
J. Gordon Angus
ATTORNEY

July 8, 1952
A. A. KNIFF
2,602,477
MACHINE FOR CUTTING TRANSVERSE SLOTS ACROSS STRIPS OF MATERIAL
Filed Aug. 1, 1949
4 Sheets-Sheet 2
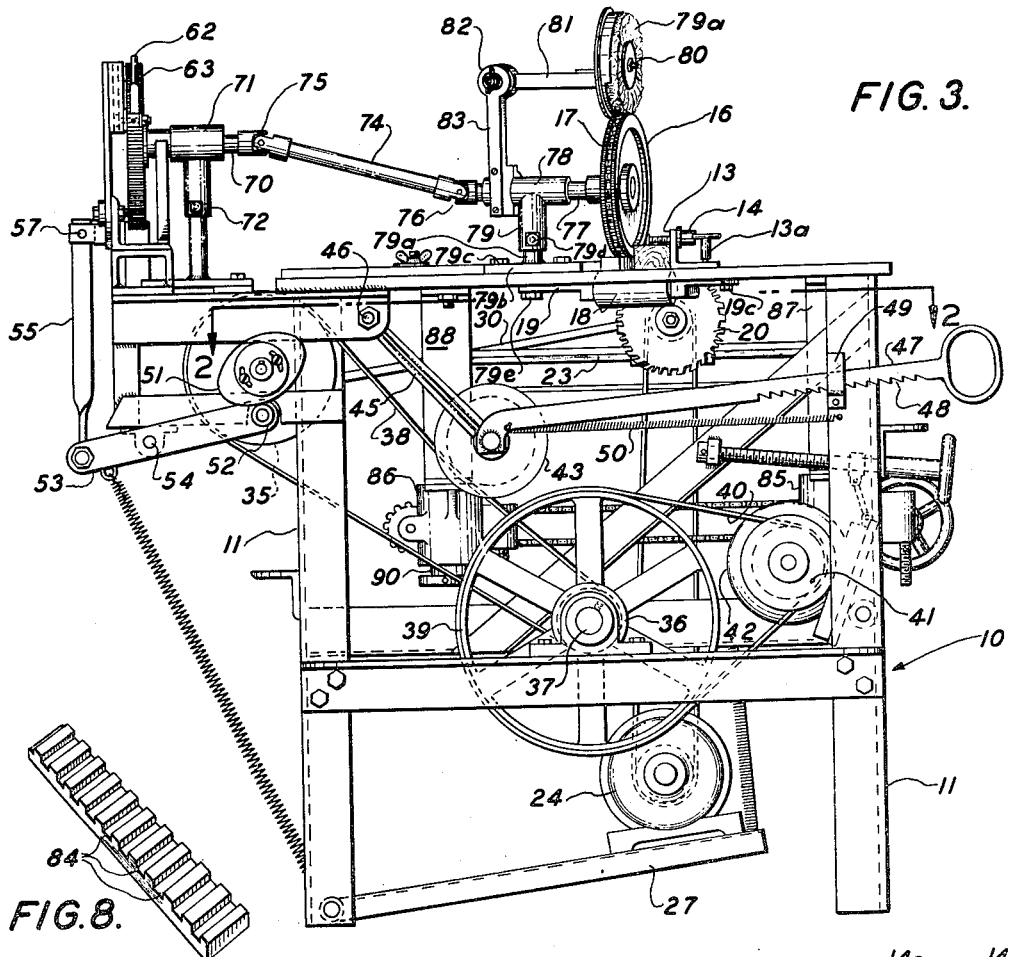
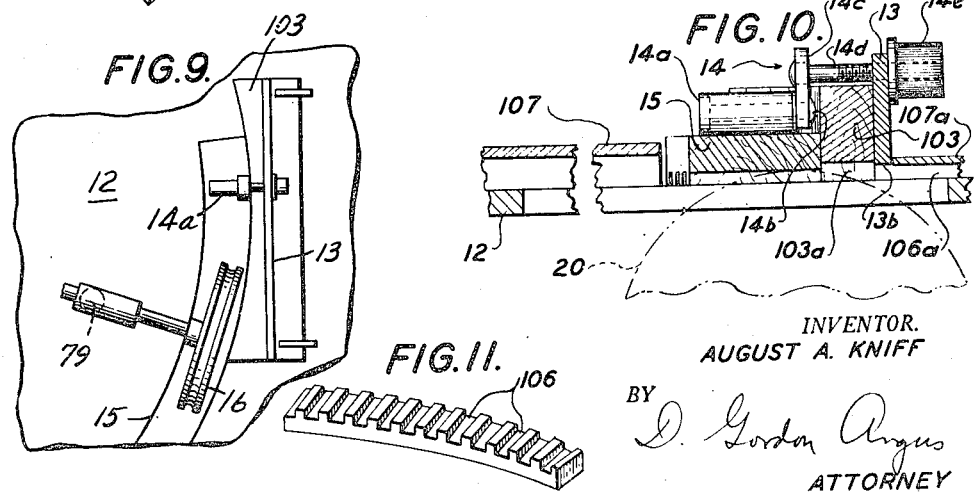
INVENTOR.
AUGUST A. KNIFF
BY D. Gordon Angus
ATTORNEY July 8, 1952 — A. A. KNIFF — 2,602,477
MACHINE FOR CUTTING TRANSVERSE SLOTS ACROSS STRIPS OF MATERIAL
Filed Aug. 1, 1949 — 4 Sheets-Sheet 3

INVENTOR.
AUGUST A. KNIFF
BY D. Gordon Angus
ATTORNEY

July 8, 1952

A. A. KNIFF 2,602,477

MACHINE FOR CUTTING TRANSVERSE SLOTS
ACROSS STRIPS OF MATERIAL

Filed Aug. 1, 1949

INVENTOR.
AUGUST A. KNIFF

BY
D. Gordon Angus
ATTORNEY

Patented July 8, 1952

2,602,477

UNITED STATES PATENT OFFICE 2,602,477

MACHINE FOR CUTTING TRANSVERSE SLOTS ACROSS STRIPS OF MATERIAL

August A. Kniff, San Dimas, Calif.

Application August 1, 1949, Serial No. 107,869

12 Claims. (Cl. 144—136)

This invention relates to machines for making special cuts, and is especially adapted for cutting the ties for the tracks of model railroad roadbeds. In model railroad constructions, it is a common practice to provide strips or lengths of roadbed of wood or the like, and to make lateral cuts across the strips at spaced distances apart so that the material which is left resembles the ties of the railroad bed. The tracks are then laid over these "ties." The making of these cuts requires many cutting operations; and for this reason it is desired to make the cuts on a machine which can do it with great rapidity.

In accordance with my present invention, I provide such a machine capable of making such cuts with great facility, rapidity and accuracy. The mechanism comprises a guide and feeding mechanism for progressing the strips intermittently into the path of a reciprocating saw or saws. Correlation is provided between the saw strokes and the intermittent strip feeding mechanism so that the saw cuts are made while the strip or work piece is at rest between intermittent motions.

A feature of the construction is the guide and feeding roller means for advancing the work piece.

Another feature is the provision of means for adjusting the cut of the saw.

An optional feature is the provision of means for guiding curved strips, suitable for making curved track.

The foregoing and other features of the mechanism will be better understood from the following detailed description and the accompanying drawings of which:

Fig. 3 shows a side elevation view of the machine;

Fig. 8 (Sheet 2) is a perspective view of a strip of straight track made by the machine;

Fig. 9 is a plan view illustrating a portion of the machine and showing the position of the mechanism when the machine is working on curved strips;

Fig. 10 is a cross-section view taken at line 10—10 of Fig. 1; and including the curved strip and guide of Fig. 9, which is not shown in Fig. 1;

Fig. 11 is a perspective view of a section of curved track bed made by the machine.

Figure 1:
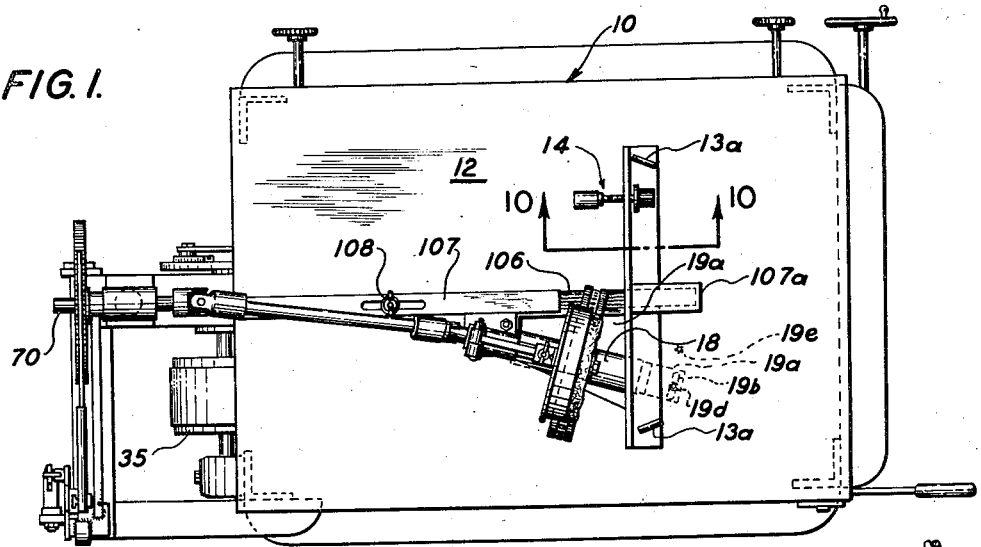
Fig. 1 is a plan view of a machine according to my invention.
Figure 2:
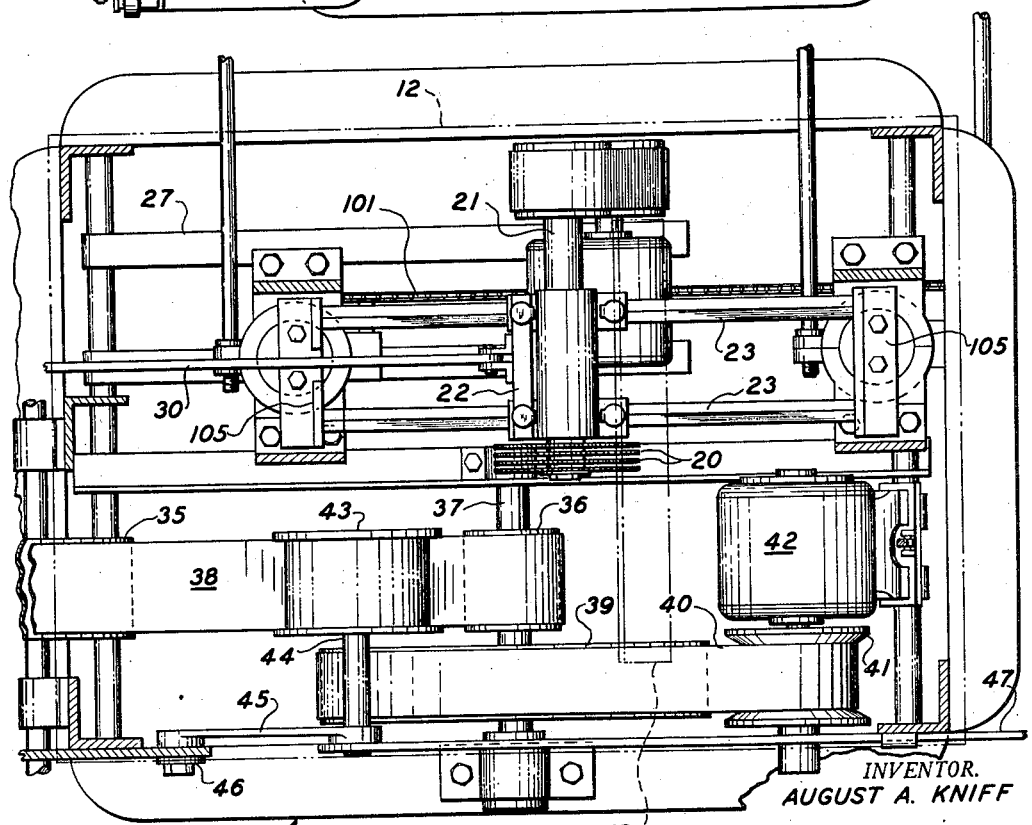
Fig. 2 is a cross-section plan view taken at line 2—2 of Fig. 3.
Figure 4:
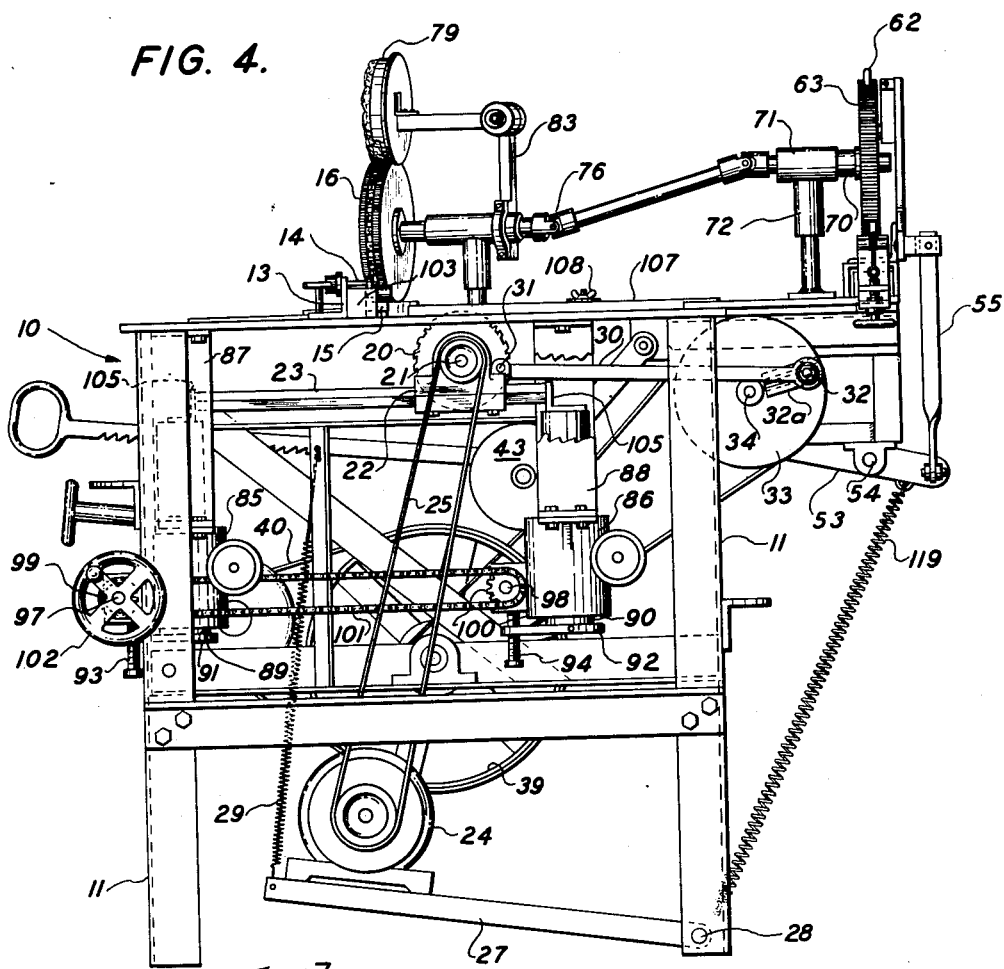
Fig. 4 is an elevation view of the machine taken from the opposite side from that shown in Fig. 3.

Referring to the drawings, the machine is built on a frame 10 comprising four solid legs 11 provided with sufficient reinforcement to make the frame stable when the sawing operation is progressing. A flat table 12 is placed on top of the frame, and on top of this table there is placed a straight-edge in the form of a straight strip 13 of angle iron or the like, a flat side of which is fastened to the table by suitable bolts or screws 13a. There is placed over the straight-edge 13 a roller assembly 14 comprising an idler roller 14a the pin 14b of which is held by a member 14c supported by a stud 14d which passes through straight-edge 13 and is bound in any angular position by a thumb screw 14e, which tightens the roller assembly members 14c and 14d against a guide 103; so that the roller can be set to hold beneath it, on the table, a work piece shown as the strip 15.

In the drawings of the machine, and as shown in the detail views of Figs. 9, 10 and 11, the strip being operated on is a curved strip for use in making curved track; and the arrangement is accordingly shown set up for this particular operation. It should be understood however, that it can also operate on straight strips. The curved strip of wood 15 is set with its edge against the curved guide 103, as shown in Figs. 9 and 10; and the curvature of the guide conforms with the curvature of the work piece 15 so that the latter can be advanced along the guide.

For the purpose of moving the work piece along the guide to progress it to different positions for cutting, there is provided a wheel 16 which may have peripheral teeth or ridges 17 which bear on the top of the work piece strip so that when the wheel turns, the strip is moved beneath the wheel along its guide; and to facilitate this movement, there is provided an idling roller 18 freely rotatable in bearings in a support 19 mounted to the under side of the table, and this roller protrudes up through an opening 19a in the top of the table so that the top of the roller is just above the level of the table and engages the under side of the work piece.

Transverse cuts are made across the work piece by circular saws 20, of which four are shown placed parallel to each other and spaced somewhat apart. These are mounted on a shaft 21 which is journaled on a carrier 22 provided with openings or bearings of square cross section adapted to slide along square cross section guide bars 23 which are mounted on brackets 105 mounted on respective adjustable plungers 89 and 90. To rotate the saws, there is provided an electric motor 24 which drives a belt 25 coupled with the belt pulley 26 fastened to the saw shaft 21. To provide for a uniform tension on the belt, the motor is mounted on a base member 27 pivoted to the frame at 28 so that due to the weight of the motor on the board, the base 27 will tend to be rotated downward to keep the belt taut. In case the motor is of excessive weight for the amount of belt tension desired, there may be provided a tension spring 29 tending to lift the base 27 upward somewhat.

The saws are located at such a level that the saw teeth will pass through the under part of the work piece 15 to make transverse cuts 106 of the type shown in Fig. 11, which shows a length of the work piece turned upside down. Thus, each time the four saws move forwardly they will make four cuts, and each time they move backwardly, they will make four more cuts. Between each series of cuts, the work piece will be advanced, so that all the cuts are evenly spaced.

To provide for the operation of the saws, there is provided an elongated opening at 106 in the top of the table 12 and of sufficient width to accommodate the upper parts of the four saws; and this opening 106 is covered by a suitable cover 107 which may be held in place by a suitable wing nut 108. The opening 106 and its cover, are long enough to accommodate the stroke of the saws. The forward end of the cover is open and directed toward the guide 103, and to enable the saws to travel through the work piece within the guide, the guide is provided with a corresponding cut-out 103a aligned with the opening or slot 106. See Fig. 10.

To reciprocate the rotating saw wheels, there is provided a rod 30 pivoted to the saw carriage at 31 and operated from a crank 32 on a fly wheel 33 which is fixed on a shaft 34. The throw of the crank is adjustable by means of guides 32a on wheel 33 so that the pivot point 32 can be adjusted relative to the center of the wheel and thus regulate the linear travel of the saw carriage along its guides. There is also fixed to shaft 34, a belt wheel 35 driven from a wheel 36 on a shaft 37 by a belt 38. A large wheel 39, also fastens to shaft 37, and is driven by a belt 40 from a pulley 41, fastened to the shaft of an electric motor 42. An idler 43 freely rotatable on a shaft 44 is provided to tension the belt 38; and for this purpose the idler shaft 44 is fixed to an arm 45, pivoted to the frame at 46. Adjustment of the tension of the belt is provided by a rod 47 freely mounted on rod 44 and provided with notches 48 which engage a fixed detent 49. Changing the notch engaging the detent alters the tension on belt 38. If desired, a tension spring 50 may be used to counterbalance the weight of the idler assembly 43.

By this arrangement, the motor 42 thus reciprocates the saw assembly so that each time the saws move forward or backward they make their respective cuts in the work piece.

Mechanism is provided to advance the work piece during the intervals between the successive cuts. This comprises a cam 51 fastened on shaft 34, the cam having two oppositely disposed high spots. The cam follower is in the form of a roller 52 on the end of a lever arm 53 and pivoted to the frame at 54. A link 55 has its lower end pivoted at 56 at the remote end of lever 53, and its upper end pivoted at 57 to an arm 58 of a bell crank which in turn is pivoted at 59 and has pivoted to its upper arm 60 a reciprocating arm 61, having a notching finger 62 which engages the teeth of a gear wheel 63. To adjust for the number of teeth which are notched per stroke of the notching arm, adjustment is provided. This adjustment comprises the longitudinal slot 64 in the arm 60 of the bell crank so that the position of pivot point 65 can be adjusted relative to the bell crank pivot 59. In order to prevent backlash, there is provided a pawl 66. The pawl is mounted on a member 67, the height of which can be adjusted by an adjusting screw 68 provided with lock nuts 69 to adjust the position of the pawl relative to the teeth. In order to insure accurate notching of wheel 63, in the event of backlash or play in the linkages 52 to 60 there may be provided a tension spring 119 to take up such backlash.

Gear wheel 63 is mounted on a shaft 70 journaled through a bearing 71 mounted on a standard 72. A shaft 74 is coupled to shaft 70 through a universal joint 75 and another universal joint 76 at the other end of shaft 74 couples shaft 74 to a shaft 77 held in a journal 78 mounted on a standard 79. The wheel 16 is fastened on shaft 77. The standard 79 is in the form of a hollow cylinder which fits over and is rotatable on a vertical post 79a extending upwardly from a sub-base 79b fastened to the table by suitable bolts 79c or the like; and a set screw 79d through the standard 79 will serve to fasten the standard in any desired angular position on the post 79a.

The lower end of post 79a protrudes downwardly beneath the table and through a hole in roller support 19 and is threaded to receive a nut 79e which tightens up against member 19 so that member 19 can be pivoted on member 79a. The opposite end 19a of member 19 is provided with an elongated slot 19b (see Fig. 1), so that a set screw 19c can pass upwardly through the slot and thread into one or the other of threaded holes 19d or 19e in the table. This will enable the roller 18 to be extended over a range of angular positions relative to the direction of the saw cuts; and ordinarily the roller 18 will be substantially aligned with the axis of wheel 16 as shown in Fig. 1.

To provide space for the saw travel, the bottom portion of the straight-edge 13 will be cut out at 13b and the guide 103 will be cut out at 103a (Fig. 10) in line with the opening 106 through the table, and the top of the table will have a corresponding cut-out 106a in line with cut out 106 which may be covered by a cover 107a.

An inking wheel 79a idles on the end of a spindle 80 held on an arm 81 fastened in a swivel 82 on the top of a standard 83 which extends from standard 79.

The mechanism just described makes cuts 84 in strips of wood or other similar material in the form shown in Fig. 8, and when the saw is properly adjusted, the cuts go only partway through the strip, as shown, the wood or material which is left between the cuts being the ties of the model railroad track bed. In its operation, the motor 24 constantly turns the rotary saw blades, while the motor 42 is turning the wheel 33 which reciprocates the saws back and forth on their guides 23. The turning of the cam 51 by action of motor 42 causes the arm 55 to move up and down as the rider 52 follows the cam, and this rocks the bell crank arm 60 to and fro to notch the gear wheel 63. Each time that the arm 60 moves toward the gear wheel, the notching finger 62 slides over the inclined teeth, the pawl 66 holding the gear wheel against backward movement. Then when the bell crank arm 60 moves away from the gear wheel, the notching finger 62 pulls the gear wheel counter-clockwise for a distance depending on the throw of arm 60. Thus, the shaft 70 is rotated for an angular distance each time the arm 60 moves away from the gear wheel. This correspondingly rotates the wheel 16 through the same angular distance through the shaft and universal joint linkage connecting wheels 63 and 16. Each time the wheel 16 makes an intermittent angular movement, it advances the work piece by a corresponding amount, and the amount of this advancement will be adjusted so that after the saws have made their cuts, for example, four cuts where four saw blades are used, the work piece will be advanced so that four more cuts will be made in advance of those just made, when the saw returns on its stroke; and the rearmost cut each time will be in advance of the foremost cut made by the preceding stroke by an amount equal to the width of a track tie.

The reciprocating strokes of the saw are correlated with the advancement of the work piece by means of the angular position of the cam 51. The arrangement is such that following each intermittent advancement of the work piece there will be a stroke of the saw carriage. For example, when the work piece stops moving, the saws will make a forward movement on their carriage. Then the cam will advance the work piece again and the saws will then make a rearward movement to make a corresponding number of cuts. This action proceeds continuously.

The depth of the cut made in the work piece is adjustable and for this purpose there are provided split cylinders 85 and 86 attached by respective brackets 87 and 88 to the frame. Plungers 89 and 90 pass through the respective cylinders 85 and 86 and plates 91 and 92 are attached at the bottoms of the respective plungers. Adjusting screws 93 and 94 are passed through the plates in a vertical direction and have worm gear teeth on their upper ends to engage worms (not shown) on respective shafts 97 and 98 which carry sprocket wheels 99 and 100 which are connected by a sprocket chain 101. A hand wheel 102 on shaft 97 serves to operate both sprocket wheels and thereby turn the adjusting screws 93 and 94. Since the positions of the cylinders 85 and 86 are fixed by the brackets 87 and 88, the turning of the adjusting screws moves the plungers up and down; and since the carriage guides 23 are mounted on the tops of the plungers, this adjusts the height of the saws. When the adjustment is made, the hand wheels 110 on studs 111 are turned to clamp the respective split cylinders 85 and 86 tight against their respective plungers 89 and 90, to hold the adjustment.

Figures 6, 7:
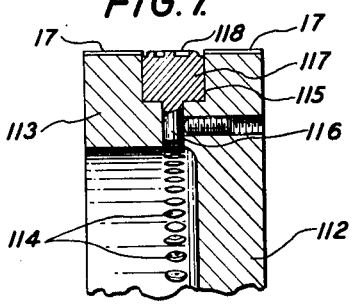
Fig. 6 (Sheet 3) is a detail view partially in cross-section showing the construction of a work piece advancing wheel used in the machine.
Fig. 7 is a cross-section view taken at line 7—7 of Fig. 6.

Figs. 6 and 7 illustrate the details of construction of the wheel 16, formed with its peripheral teeth or ridges 17 on each side of the central plane. The wheel is formed with a hub 112 and an overhanging peripheral flange 113. Through this flange there are a number of holes 114 which are enlarged at their peripheral extremities 115. The stems 116 of plugs 117 are inserted into the respective holes, the plugs fitting within the openings 115. The outer surface of each plug, if desired, may have a figure or letter or the like 118. Thus, as the wheel 16 rotates in advancing the work piece, it will correspondingly mark the upper surfaces of the work piece (the bottom of the model railroad track) with indented ridges and figures or letters, etc.; and the inking wheel 79 serves to ink these configurations so that they can readily be seen in the work piece.

Figure 12:
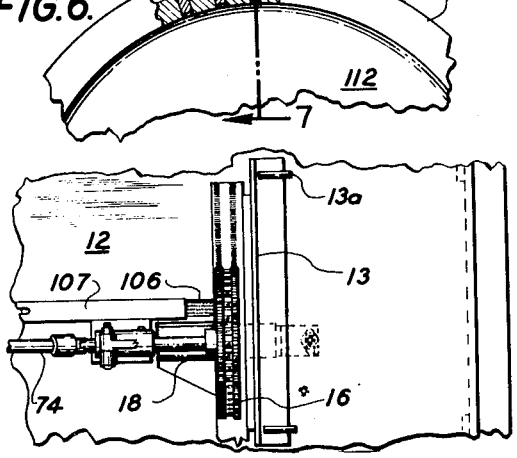
Fig. 12 (Sheet 3) is a plan view illustrating the position of the mechanism when the machine is working on straight strips.
Figure 5:
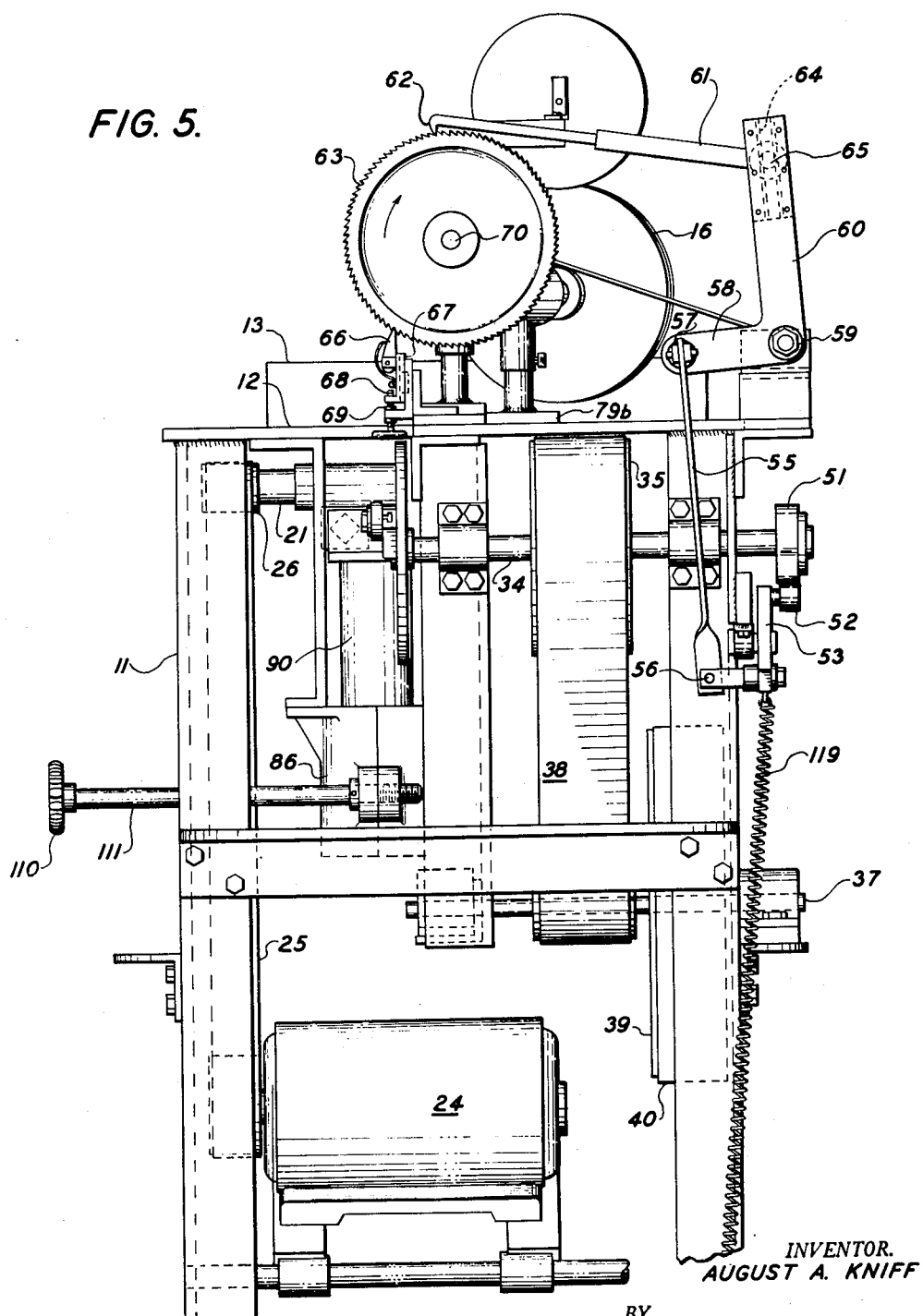
Fig. 5 is an end elevation view of the machine.

In Figs. 1 to 4, the arrangement of the parts is such as to operate on a curved strip against the curved guide 103 of Fig. 9; and for this purpose, the mounting post 79 for the wheel 16 is turned at an angle off center with reference to the shaft 70, as shown. It should be understood, however, that the machine is as well adapted to operate on straight strips as curved strips; and when straight strips are used, the curved guide 103 of Fig. 9 will be dispensed with as the straight strips can be held with their edges against the straight-edge 13. For this purpose, the standard 79 and the support of the roller 18 will be turned so that the axes of the wheel 16 and of the roller 18 will be substantially parallel with shaft 70, and thereby be substantially centered with reference to straight-edge 13, as illustrated in Fig. 12. In this position, the wheel 16 then will feed a straight strip along the straight edge; and the same kind of saw cuts and markings will be placed on the strip as in the case of a curved strip. Fig. 8 illustrates such a straight strip provided with the saw cuts.

Other modifications of the arrangement may, of course, be used instead of the exact arrangements illustrated in the drawings. For example, it may be possible or sometimes desirable to provide an overhead saw system, instead of the particular saw arrangement located beneath the table. Such an overhead saw system could, for example, be provided by mounting the saws on the lower end of a long arm or pendulum pivoted from above, for example at the ceiling of the room. Such a pendulum could then be reciprocated by the linkage mechanism in a similar manner to the reciprocation of the carriage shown in Figs. 1 and 4. In such event, the saws would make a cut on top of the work piece instead of underneath, and the cuts would be somewhat arcuate; but with a long enough pendulum, the arcuate curvature would be unnoticed. With saw cuts on top of the work piece, this top part would then constitute the ties of the model railroad bed instead of the bottom of the road bed, as in the embodiment shown in the drawings. In the event of the use of such an overhead pendulum system, the driving motor for the saws could then be mounted on the pendulum itself.

Other modifications, likewise, may suggest themselves, and the invention is not to be considered as limited to the particular constructions and details shown in the drawings, which are given by way of illustration rather than of limitation; and the invention is not limited except in accordance with the scope of the appended claims.

I claim:

1. A slot-cutting machine comprising a table, a work piece guide on the table, said guide guiding the movement of a work piece on the table, a reciprocating carriage movable back and forth in a path transverse to the direction of movement of the work piece, a power-driven rotary saw means mounted on said carriage, a power-drive means for reciprocating the carriage and advancing the work piece, said power-drive means comprising an advancing wheel in contact with the top of the work piece for advancing said work piece along the guide, said advancing wheel being operable in intermittent angular motions from said power-drive means through a cam and follower, the cam causing said intermittent motions of the wheel, and a crank means reciprocating the carriage and correlated with the cam to produce reciprocating strokes of the carriage at intervals between the intermittent angular motions of the wheel, said table being provided with a slot transverse to the direction of movement of the workpiece, and the guide has a transverse recessed passage at its lower side aligned with the slot, through which the top of the rotary saw protrudes, the main part of the saw being beneath the table, and the wheel being located above the table and above the workpiece, whereby the saw cuts only the lower part of the workpiece.

2. Apparatus according to claim 1 in which the means for producing the intermittent angular advancements of the wheel comprises a ratchet wheel having teeth and a notching finger correlated with said teeth which advance the ratchet wheel in response to movement of the cam, and a pawl engaging the teeth to prevent backlash, said pawl being adjustable relative to the teeth for establishing exact advancement of the wheel.

3. Apparatus according to claim 1 in which the guide comprises a straight edge which is attached on the top of the table; and angular rotation of the advancing wheel advances the work piece along the straight edge.

4. Apparatus according to claim 1 in which the guide comprises a curved wall adapted to guide a curved work piece.

5. Apparatus according to claim 4 in which the advancing wheel is mounted on a shaft substantially parallel to the table top and pivoted at a position approximately at the radius of curvature of the guide.

6. Apparatus according to claim 1 in which a roller is provided beneath the work piece guide and the top of the roller is very slightly above the level of the table top, so that the work piece in advancing, moves along the top of said roller, and the roller and the advancing wheel are adapted to be moved to different angular positions relative to the path of the saw stroke to accommodate curved workpieces.

7. A slot cutting machine adapted to cut model railroad track ties, said machine comprising a table on which the work piece is placed, a guide on the table for guiding the advancement of the work piece, a rotary saw means rotatable on a reciprocating axis transverse to the direction of advancement of the work piece, and a power drive means for reciprocating the saw axis and advancing the work piece, said power drive means comprising an advancing wheel in friction contact with the upper surface of the work piece for advancing the work piece along the guide, said advancing wheel being rotatable in intermittent angular motions from said power drive means through an intermittent angular movement device, and means for reciprocating the saw wheel axis, said reciprocating means being correlated with the angular movement producing means whereby the reciprocating movements of the saw axis occur between the intermittent angular movements of the advancing wheel, and a recessed passage through the lower portion of the guide aligned with the path of travel of the saw means, for accommodating the saw means in passing the guide, whereby the saw means cuts a slot through the bottom portion of the workpiece.

8. Apparatus according to claim 7 in which a plurality of spaced circular saws are mounted on said axis at a distance apart corresponding to the distance of the track ties, and the angular advancement advances the work piece an amount corresponding to the number of saws.

9. A slot-cutting machine comprising a substantially horizontal table, a workpiece guide which guides the movement of a workpiece, a reciprocating carriage movable back and forth in a path which intersects the direction of movement of the workpiece, a power operated rotary saw means mounted on said carriage and movable through a passageway through the table, with only the upper portion of the saw protruding above the table, a recess through the workpiece guide and aligned with the passageway through the table, to accommodate the saw means, a power drive means for reciprocating the carriage and advancing the workpiece in correlation with the reciprocation of the carriage, said power drive means comprising an advancing wheel for making frictional contact with the top of the workpiece for advancing the workpiece along the guide, said advancing wheel being mounted on a substantially horizontal shaft and driven from the drive, means pivotally supporting said horizontal shaft above the table so that the advancing wheel can assume different angular positions at the top of the workpiece, and means for rotating the advancing wheel in successive intermittent movements correlated with successive reciprocations of the saw means.

10. Apparatus according to claim 9 in which a roller is placed beneath the workpiece and rotatable on a horizontal shaft which is pivoted at substantially the vertical axis of said pivotally supporting means, and means for securing the roller shaft at different angular positions relative to the pivot.

11. Apparatus according to claim 9 in which said workpiece guide is curved.

12. Apparatus according to claim 9 in which said advancing wheel is driven by shaft means having articulate linkages to accommodate the different angular positions.

AUGUST A. KNIFF.

REFERENCES CITED

The following references are of record in the file of this patent:

UNITED STATES PATENTS

| Number | Name | Date |
|---|---|---|
| 291,155 | Compton | Jan. 1, 1884 |
| 293,037 | Kautz | Feb. 5, 1884 |
| 335,833 | Oetzel | Feb. 9, 1886 |
| 404,377 | Barnes | June 4, 1889 |
| 636,170 | Palmer | Oct. 31, 1899 |
| 702,360 | Dwight | June 10, 1902 |
| 705,483 | Tidey | July 22, 1902 |
| 733,063 | Marsh | July 7, 1903 |
| 881,064 | Favreau | Mar. 3, 1908 |
| 1,049,019 | Whelan | Dec. 31, 1912 |
| 1,067,360 | McSorley | July 15, 1913 |
| 1,346,269 | Smith | July 13, 1920 |
| 1,715,206 | McDonough | May 28, 1929 |
| 1,735,216 | Sims | Nov. 12, 1929 |